June 13, 1950  B. D. SMITH  2,511,743
BEAD LOOSENING TIRE TOOL

Filed March 13, 1946  2 Sheets-Sheet 1

INVENTOR.
Blanchard D. Smith
BY
Jewett and Mead
ATTORNEYS

June 13, 1950  B. D. SMITH  2,511,743
BEAD LOOSENING TIRE TOOL
Filed March 13, 1946  2 Sheets-Sheet 2

INVENTOR.
Blanchard D. Smith
BY
Jewett and Mead
ATTORNEYS

Patented June 13, 1950

2,511,743

UNITED STATES PATENT OFFICE 2,511,743

BEAD LOOSENING TIRE TOOL

Blanchard D. Smith, Atlanta, Ga.

Application March 13, 1946, Serial No. 654,122

2 Claims. (Cl. 157—1.28)

The invention relates to tire tools and has as an object the provision of a tool to assist in removal of tires from rims.

It is an object of the invention to provide a tool that may be actuated to break one bead of a tire casing from a rim before the other bead is loosened.

It is a further object to provide a tool that may be actuated to first break loose one bead and later to react against the rim while loosening the remaining bead.

Further objects will appear from the following description when read in connection with the accompanying drawings showing an illustrative embodiment of the invention and wherein.

Figure 1:
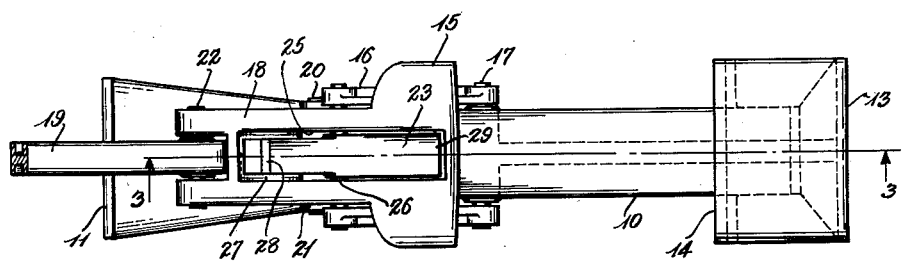
Figure 1 is a plan view.

As shown the device comprises a base member 10 adapted to rest on the ground while the tool is in use, and formed to project at 11 to a position such that a foot of the user may press on the base to prevent sliding movement of the tool while the near bead of a tire is broken loose from a rim 12.

Rising from the base 10 and shown as integral therewith is an arm 13 upwardly and laterally terminating in a jaw 14.

To support and actuate a second jaw 15, there is shown an H-shaped member 16 pivoted on a pin 17 and pivotally supporting an arm 18 which rigidly carries the jaw 15.

To move the arm 18 and jaw 15 toward the jaw 14 a hand lever 19 is shown pivoted at 20 between spaced lugs 21 rising from the base 10 and to which lever the arm 18 is pivoted at 22. The arm 18 is shown as bifurcated to provide an eye at each side of the lever to receive the pivot pin 22.

The height of axis 20 above the base and the spacing of the axes 20 and 22 are each substantially one-half of the length of the H member 16 between its pivot points. It results that the movement of the jaw 15 towards jaw 14 after contact of jaw 15 with the tire will be in a substantially straight line; for the reason that the tendency of jaw 15 to move in an arc about axis 26 will be countered by the arcuate movement, at this time, of axis 22.

Figure 2:
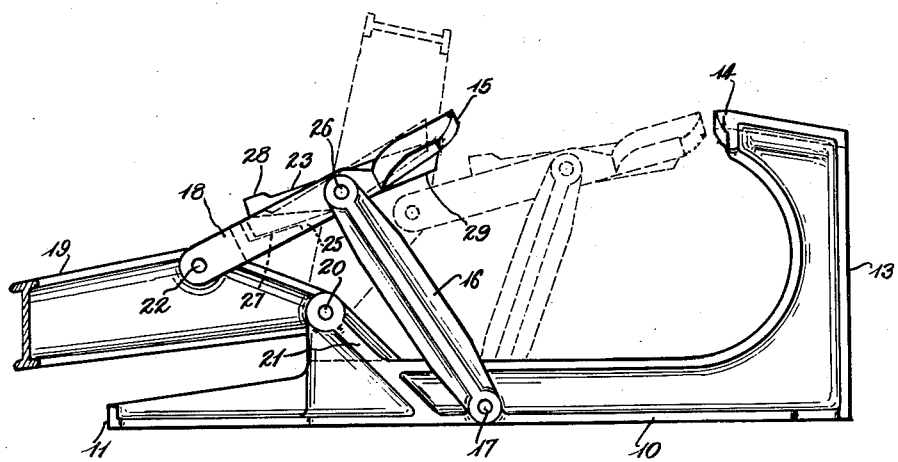
Figure 2 is a side elevation.
Figure 3:
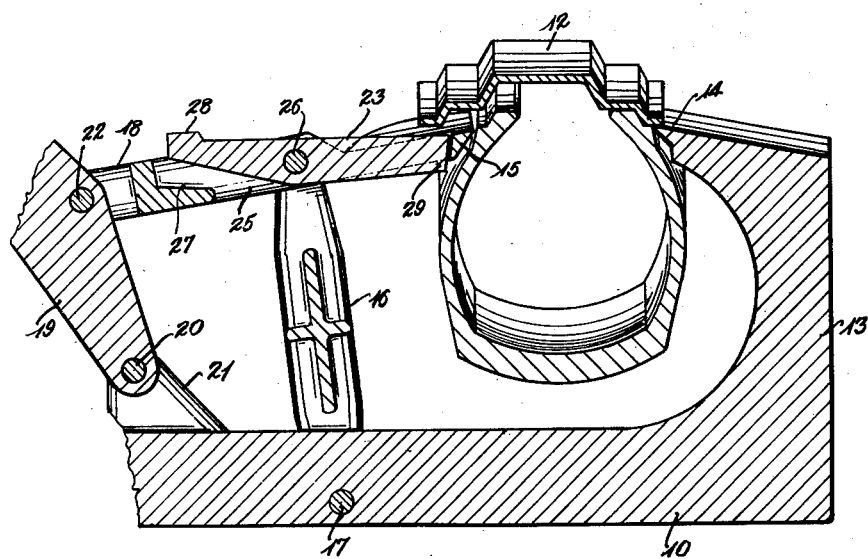
Figure 3 is a detail central section on line 3—3 of Figure 1, drawn to an enlarged scale.
Figure 4:
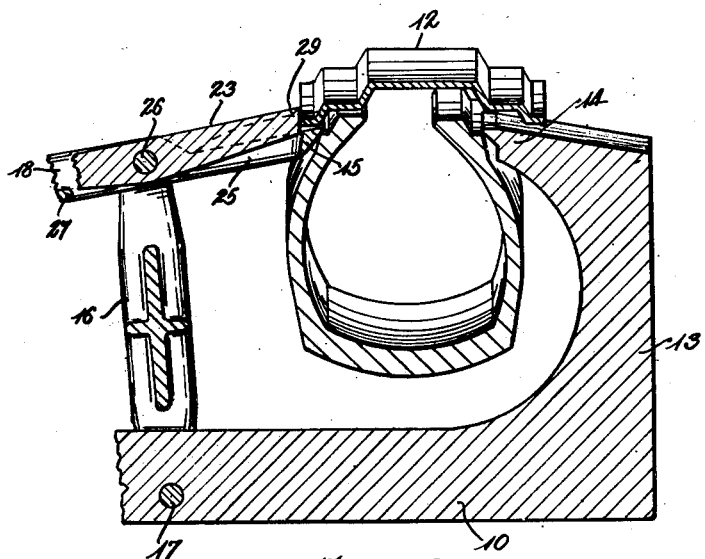
Figure 4 is a view similar to Figure 3 showing a different position of the parts.

For a purpose to be described a tongue 23 is shown carried in an elongated opening or recess 25 in the pivot rod 26 in which the arm 18 is pivoted. A shelf or shoulder 27 is shown in the recess 25 to serve as a stop for the end 28 of the tongue. The end 29 of the tongue is made thicker than the end 28 thereof and the pivot of the tongue is nearer the end 28 whereby, if the tongue is not manually controlled, the end 29, shown as slightly beveled, will be depressed by gravity and will rest on the complemental bevel of the end of the recess 25 in the position shown in Figures 2 and 3.

To adapt the device for use with tires of a range of diameters, the height of the jaws above the upper surface of the base 10 is made sufficient to receive the largest tires to be operated on.

In use the wheel is jacked up to raise the rim 12 to just clear the jaw 14, and the device is placed under the tire. If then the hand lever is moved, if there was no friction of the base 10 on the ground, and if both rims were free to leave the rim, the tire beads would move toward each other an equal distance and the tool would move toward the operator one-half the sum of the movements of the beads.

It is found to be more efficient to wholly break one bead from the rim before starting to break the other. To this end the friction of the device on the ground is increased by placing a foot of the operator on the end 11 of the base 10. The friction of the base on the ground with the probable adherence of the bead at the jaw 14 will cause the jaw 15 to loosen its bead first. The jaws 14 and 15 are shown arcuate in form to substantially conform to the curvature of the average rim. Therefore, the jaws 15 if moved to carry its bead substantially across the rim to the fixed bead will loosen the first bead beyond the circumferential extent of its bead. By revolving the wheel between movements of the jaw 15 to apply the same at possibly three positions the first bead will be entirely loosened from the rim.

With the bead adjacent jaw 15 completely loosened the end 28 of tongue 23 is held depressed to elevate the end 29 thereof into position to impinge against the rim whereupon actuation of the hand lever will cause the jaw 14 to loosen its bead.

Minor changes may be made in the physical embodiment of the invention within the scope of the appended claims without departing from the spirit of the invention.

I claim:

1. A tire tool comprising, in combination: a base member; an arm rigid with said base member and projecting laterally therefrom; a jaw rigid with said arm and overhanging said base member; a member pivoted on said base member in spaced relation to said arm; a second arm pivoted on said pivoted member and terminating in a jaw opposed to said first named jaw; a tongue pivotally associated with said second named arm having a free end normally extending substantially flush with the upper surface of said last named jaw; means to manually move said tongue about its pivot to raise its free end above the surface of the jaw adjacent thereto to impinge against a tire rim; and lever means to cause relative movement between said jaws.

2. A tire tool comprising, in combination: a ground supported base member; an arm rigid with said base member, rising therefrom and terminating in a jaw rigid with the arm and overhanging the base member; a pair of spaced, rigidly connected arms, their lower ends spanning and pivoted to the base member; a pair of spaced lugs rigid with the base member and projecting thereabove; a hand lever pivoted at one end thereof between said lugs; a movable jaw carrying arm pivoted between its ends to the combined upper ends of said spaced arms and at its end opposite the jaw thereon to said hand lever; whereby lifting the free end of said hand lever may move said movable jaw into contact with a tire bead and continued upward movement of said free end may cause substantially straight line movement of the movable jaw to cause loosening of the bead from a tire rim.

BLANCHARD D. SMITH.

REFERENCES CITED

The following references are of record in the file of this patent:

UNITED STATES PATENTS

| Number | Name | Date |
| --- | --- | --- |
| 1,003,030 | Burt | Sept. 12, 1911 |
| 1,066,210 | Mahon | July 1, 1913 |
| 1,392,591 | Mobley | Oct. 14, 1921 |
| 1,439,381 | Safstrom | Dec. 19, 1922 |
| 2,280,380 | Davenport | Apr. 21, 1942 |
| 2,439,135 | Johnson et al. | Apr. 6, 1948 |